(12) United States Patent
Chen (10) Patent No.: US 6,952,063 B1
(45) Date of Patent: Oct. 4, 2005

(54) BRAKING ASSEMBLY WITH MANAGEABLE SELF-GENERATING POWER ENERGY

(76) Inventor: Yu-Yu Chen, 1F., No. 9-1, Alley 45, Lane 236, Sec. 5, Jhongsiao E. Rd., Taipei City (TW) 110

( * ) Notice: Subject to any disclaimer, the term of this patent is extended or adjusted under 35 U.S.C. 154(b) by 0 days.

(21) Appl. No.: 10/869,953

(22) Filed: Jun. 18, 2004

(51) Int. Cl.[7] .......................... H02K 49/10; B60L 7/00
(52) U.S. Cl. ................. 310/93; 310/68 R; 310/68 D; 310/DIG. 6; 188/161; 188/267
(58) Field of Search .......................... 310/68 R, 68 D, 310/92–93, 103, 105, DIG. 6, 107; 188/161, 188/164, 267; 482/63

(56) References Cited

U.S. PATENT DOCUMENTS

| | | | |
|---|---|---|---|
| 5,711,404 A * | 1/1998 | Lee | 188/164 |
| 5,986,370 A * | 11/1999 | Cheng | 310/77 |
| 6,084,325 A * | 7/2000 | Hsu | 310/74 |
| 6,345,703 B1 * | 2/2002 | Peng | 188/164 |
| 6,360,855 B1 * | 3/2002 | Szu-Yin | 188/161 |
| 6,468,186 B2 * | 10/2002 | Lay | 482/63 |
| 6,581,731 B2 * | 6/2003 | Chen | 188/164 |
| 6,585,087 B2 * | 7/2003 | Lin | 188/164 |
| 6,719,107 B1 * | 4/2004 | Chen | 188/164 |

* cited by examiner

Primary Examiner—Burton Mullins
(74) Attorney, Agent, or Firm—Rosenberg, Klein & Lee (57) ABSTRACT

A braking assembly with a manageable self-generating power energy is disclosed. A pair of curved braking plates are disposed between the stator and the rotor. A pulling mechanism is provided on the stator for pulling two free ends of two curved braking plates. A plurality of first permanent magnets are fixed to the outer circumferential surface of each the curved braking plates. Moreover, at least one power-generating coil is provided on a stator of the braking assembly nearby the permanent magnets for generating an AC voltage when the rotary central shaft rotates. A control circuit receives the AC voltage and rectifies and stabilizes the AC voltage to generate a DC voltages to drive the motor of the pulling mechanism to rotate, and by means of the pulling mechanism, the braking force of the braking assembly is controlled.

12 Claims, 7 Drawing Sheets

BRAKING ASSEMBLY WITH MANAGEABLE SELF-GENERATING POWER ENERGY

BACKGROUND OF THE INVENTION

1. Field of the Invention

The present invention relates to a braking force regulating structure for a braking device, and more particularly to a braking assembly with a manageable self-generating power energy.

2. Description of the Prior Art

A conventional braking assembly, such as the brake for an exercise bike, mainly includes a rotor and a stator. Two corresponding curved braking plates are pivotally connected to the stator, and a plurality of curved permanent magnets are provided at an outer circumferential surface of the curved braking plates, such that outer circumferentially surfaces of the curved permanent magnets face toward an inner circumferential surface of the rotor with a proper air clearance left between them. When the rotor rotates, an eddy current is produced as a result of an induction between the permanent magnets and the rotor and consequently, a dragging force will be applied the rotor. The smaller the air clearance between the permanent magnets and the rotor is, the stronger the induced eddy current is, and the larger the produced dragging/braking force is. Accordingly, this dragging force can be used as the resistance of sporting equipment.

To regulate the braking force, the conventional braking assembly includes a cable that can be manually operated to pull one of two ends of each curved braking plate and thereby adjust a distance of the air clearance between the outer circumferential surfaces of the permanent magnets and the inner circumferential surface of the rotor and accordingly, the braking force of the braking assembly.

Other similar types of conventional braking structures are also found in prior patents. U.S. Pat. No. 6,360,855 discloses a brake for an exercise bike. The brake includes a first and a second disc-shaped plate, a center shaft extended between the two disc-shaped plates, and a plurality of bars and rollers located between the two disc-shaped plates to space the latter from each other by a predetermined distance. The brake also internally includes two curved plates having magnets provided on outer circumferential surfaces thereof. The two curved plates are pivotally connected at an end to and between the two disc-shaped plates, and connected at the other end to a pulling cord. When the pulling cord is pulled, a braking effect of the brake may be changed.

A disadvantage of the above-mentioned conventional brakes is that it must be manually operated to regulate the braking force thereof. To change the manually operated brake to a power-controlled brake, it is necessary to connect with an external power source so as to supply power to a driving mechanism of the brake. This requirement restricts the mounting of the brake to a position close to a power supply, otherwise wiring to power source is needed.

Therefore, it is desired to release the conventional brake from the limitations of being mounted close to the external power source, so that the brake may be conveniently used at any place.

To meet the above requirement, there is developed a self-excitation type power-generating braking structure. U.S. Pat. No. 6,084,325 discloses a brake device with a combination of power-generating and eddy-current magnetic resistance, in which a power-generating coil is provided to one side of a flywheel. When the flywheel rotates, the power-generating coil is caused to generate electrical energy to produce a braking force. However, the power-generating coil must work with the large flywheel to produce the required electrical energy and could not be integrated into the braking device. This results in a complicate structure of the braking device and troublesome assembling and mounting thereof.

It is therefore tried by the inventor to develop a braking assembly with self-generating power energy to eliminate the drawbacks existed in the conventional brakes.

SUMMARY OF THE INVENTION

A primary object of the present invention is to provide a braking assembly with self-generating power energy. The braking assembly has power-generating function to provide electric power energy needed by an internal pulling mechanism and an external control panel thereof, so that the braking assembly can be conveniently mounted for use without the need of connecting to an external power supply.

To achieve the above objects, in accordance with the present invention, there is provided a braking assembly with a manageable self-generating power energy. A pair of curved braking plates are disposed between the stator and the rotor. A pulling mechanism is provided on the stator for pulling two free ends of two curved braking plates. A plurality of first permanent magnets are fixed to the outer circumferential surface of each the curved braking plates. Moreover, at least one power-generating coil is provided on a stator of the braking assembly nearby the permanent magnets for generating AC voltage when the rotary central shaft rotates. A control circuit receives the AC voltage and rectifies and stabilizes the AC voltage to generate a DC voltage to drive the motor of the pulling mechanism to rotate, and by means of the pulling mechanism, the braking force of the braking assembly is controlled.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
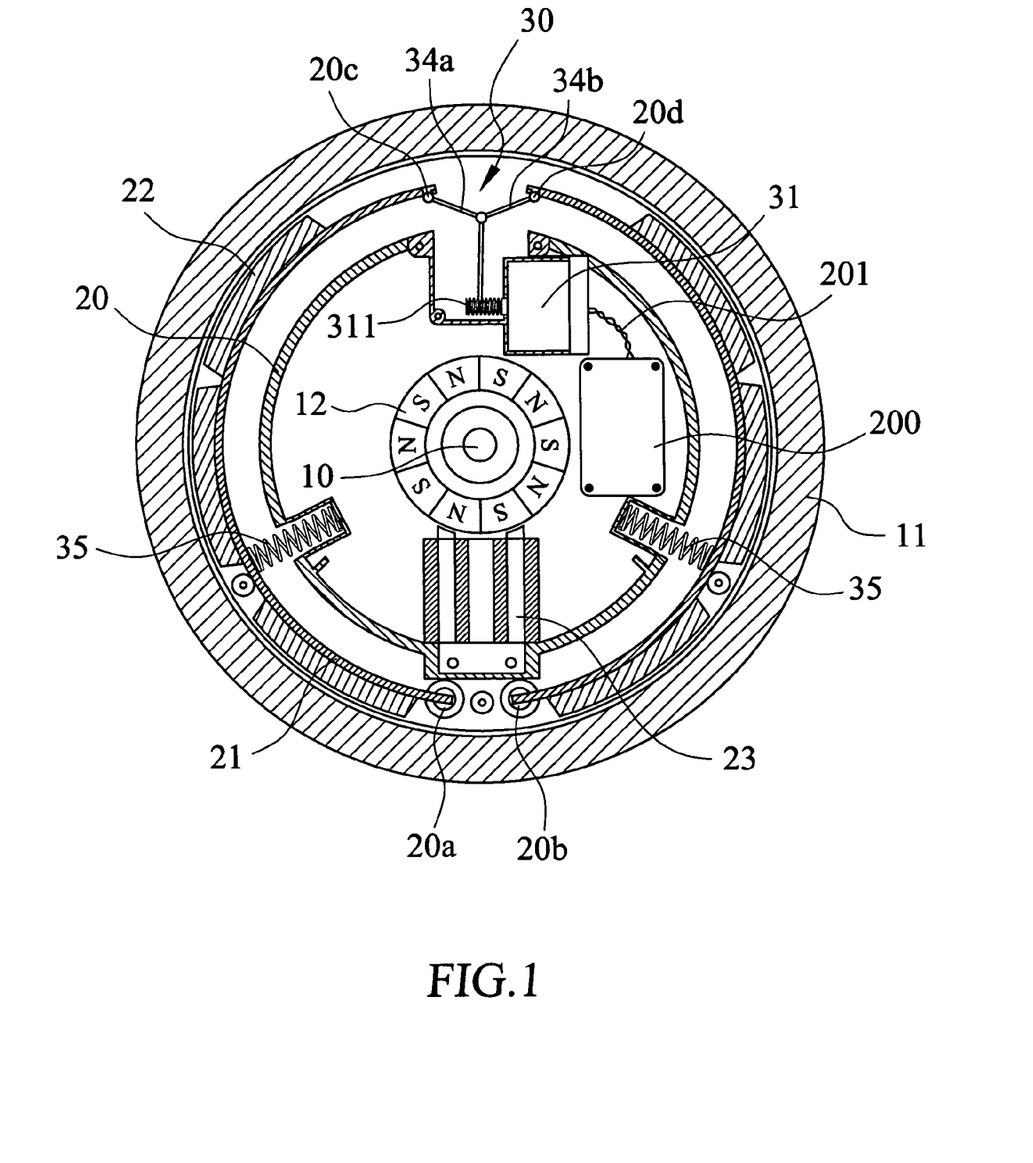
FIG. 1 is a plan view of a braking assembly with a manageable self-generating power energy according to a first embodiment of the present invention.

Please refer to FIG. 1 that is a plan view of a braking assembly according to a first embodiment of the present invention. As shown, the braking assembly of the present invention mainly includes a rotary central shaft 10, a rotor 11 rotating along with the rotary central shaft 10, a stator 20, and two curved braking plates 21. The rotor 11 may be made of cast iron, forge iron, or cast steel.

Two adjacent ends of the two curved braking plates 21 are pivotally connected via pivoting means, such as pivot shafts 20a and 20b, to predetermined positions on an outer circumferential surface of the stator 20, and the other two adjacent ends of the two curved braking plates 21 are left suspended, so that outer circumferential surfaces of the curved braking plates 21 face toward an inner circumferential surface of the rotor 11. By regulating an air clearance between the outer circumferential surfaces of the curved braking plates 21 and the inner circumferential surface of the rotor 11, a magnitude of a braking force of the braking assembly may be controlled.

The curved braking plates 21 are fixedly provided on respective outer circumferential surfaces with a plurality of permanent magnets 22. The permanent magnets 22 have curved outer surfaces facing toward the circumferential inner surface of the rotor 11. In the present invention, there are permanent magnets 12 continuously arranged around an outer surface of the rotary central shaft 10, so that the north poles and the south poles alternate around the rotary central shaft 10. A first power-generating coil 23 is provided on the stator 20 at a position close to the permanent magnets 12.

In addition, the stator 20 also has a pulling mechanism 30 provided thereon for regulating the air clearance between the curved braking plates 21 and the rotor 11. The pulling mechanism 30 includes two pulling cords 34a, 34b which are fixedly connected at respective one end to free ends 20c, 20d of the two curved braking plates 21, and at respective another end to a transmission shaft 311 of the motor 31 for dragging. The pulling cords 34a, 34b may be, for example, two linking bars or two ropes for connecting two free ends 20c, 20d of the curved braking plates 21 and the driving shaft 311. By pulling or releasing the pulling cords 34a, 34b, the air clearance between the outer circumferential surfaces of the curved braking plates 21 and the inner circumferential surface of the rotor 11 is regulated, and thereby the braking force of the braking assembly is controlled.

As can be seen from FIG. 1, each of the two curved braking plates 21 is provided at a predetermined position on an inner circumferential surface with a compression spring 35 to radially extend between the curved braking plate 21 and the stator 20, so that the compression spring 35 provides a radially outward restoring force to the curved braking plate 21. When the rotor 11 stops rotation, the curved braking plates 21 restore to its normal position where the dragging force is minimal to avoid damage to the user.

With the above arrangements, when the rotary central shaft 10 rotates, it brings the rotor 11 to rotate synchronously. At this point, excitation eddy currents are generated between the rotor 11 and the permanent magnets 22 mounted on the curved braking plates 21 fixed to the stator 20 to brake the rotor 11.

And, while the rotary central shaft 10 rotates, an AC voltage is produced by the power-generating coil 23 due to a magnetic induction between the power-generating coil 23 and the permanent magnets 12 provided on the outer surface of the rotary central shaft 10.

Figure 2:
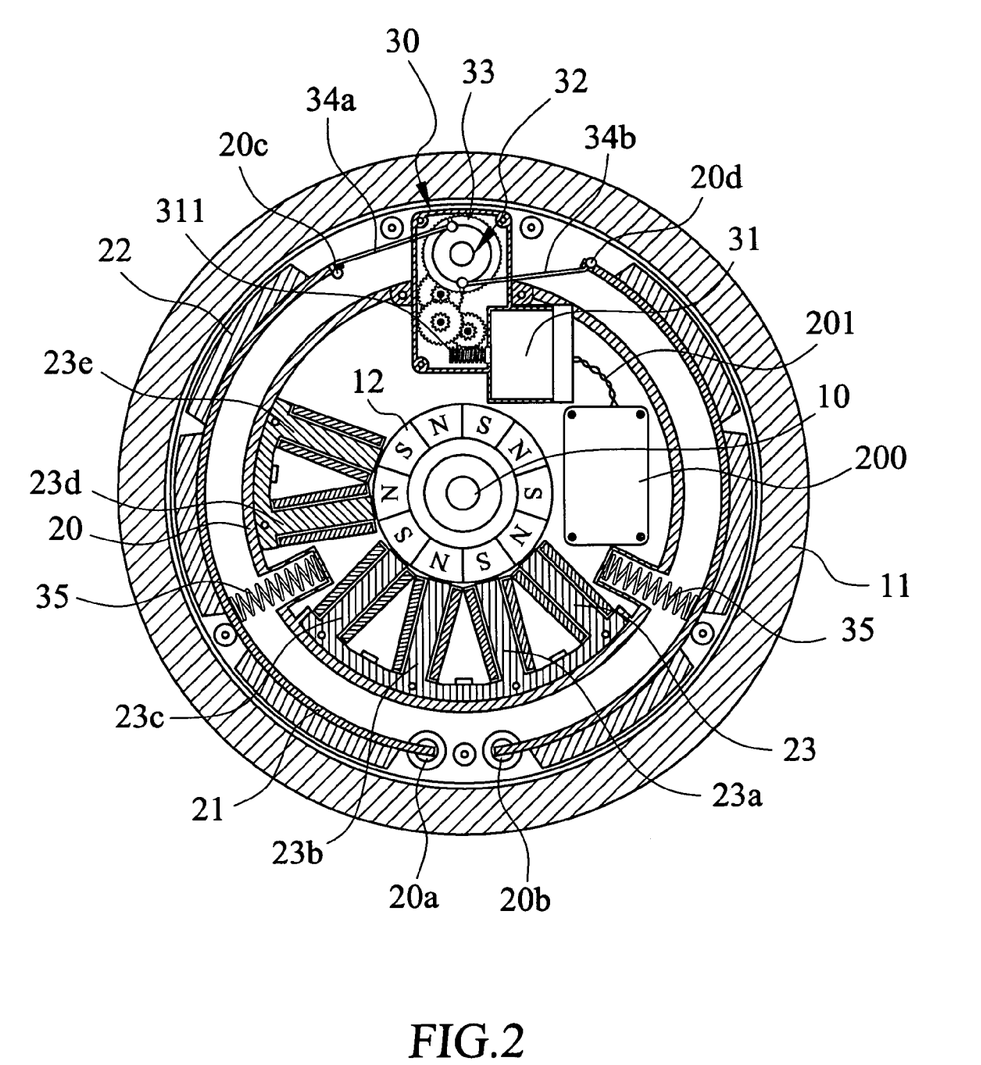
FIG. 2 is a plan view of the braking assembly according to a second embodiment of the present invention.

FIG. 2 is a plan view showing the second embodiment. The second embodiment is substantially similar to the first embodiment, and like reference numerals are used to identify elements that are similar or identical in the two embodiments. However, the second embodiment is different to the first embodiment in that the pulling mechanism 30 comprises a reduction gear set 32 which includes a toothed disc 33. Two pulling cords 34a, 34b are fixedly connected at respective one end to two diametrically opposite points on the same side surface of the toothed disc 33, and at respective another end to free ends 20c, 20d of the two curved braking plates 21. The pulling cords 34a, 34b may be, for example, two linking bars or two ropes for connecting two free ends 20c, 20d of the curved braking plates 21 and the pulling mechanism 30.

In this embodiment, a plurality of power-generating coils, the first, second, third, fourth, fifth and sixth power-generating coil 23, 23a, 23b, 23c, 23d, 23e, are provided on the stator 20 at positions close to the permanent magnets 12. While the rotary central shaft 10 rotates, AC voltage is produced by each of the power-generating coils 23, 23a, 23b, 23c, 23d, 23e due to the magnetic induction between the first, second, third, fourth, fifth and sixth power-generating coil 23, 23a, 23b, 23c, 23d, 23e and the permanent magnets 12 provided on the outer surface of the rotary central shaft 10.

The produced AC voltage generated by each of the second, third, fourth, fifth and sixth power-generating coils 23a, 23b, 23c, 23d, 23e may be rectified and stabilized by conventional rectifier and stabilizer to generate DC voltages and provided in serial to a motor 31 of the pulling mechanism 30 to increase the working power. This is critical for maintaining a steady and sufficient working power, especially when the power supply from the first power-generating coil 23 is not enough.

The powers generated by the power-generating coils 23a, 23b, 23c, 23d, 23e may also be used for other purposes. Take for an example. The powers may be provided to power a microprocessor or other electronic elements on a control circuit of a circuit board 200. The power is then conveyed from the circuit board 200 to the motor 31 by a cable 201 connected between the circuit board 200 and motor 31. Besides, the powers generated by the power-generating coils 23a, 23b, 23c, 23d, 23e may be provided to power the indicator and backlight and display unit of the control circuit or other exercise equipment.

Figure 3:
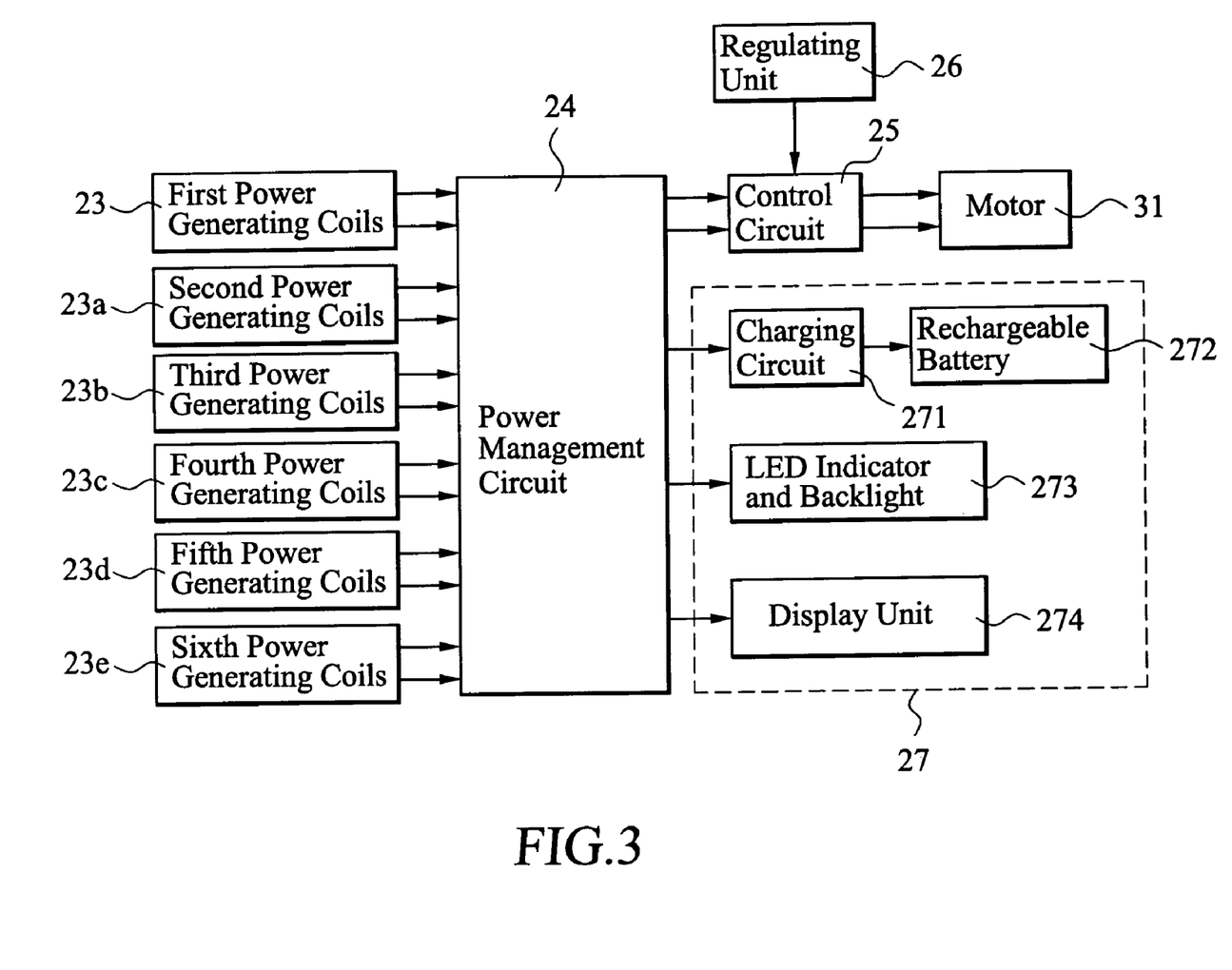
FIG. 3 is a circuit block diagram of the present invention.

Please refer to FIG. 3 which is a circuit block diagram of the present invention. As shown, the powers generated by the power-generating coils 23, 23a, 23b, 23c, 23d, 23e is regulated and distributed by a power management circuit 24.

When the present invention includes only one power generating coil, for example the first power generating coil 23, the power generated by the first power generating coil 23 flows under the control of the power management circuit 24 to the motor 31 and a control panel 27. The control panel 27 comprises a charging circuit 271, a rechargeable battery 272, a LED indicator and backlight 273 and a display unit 274.

The powers generated by the power generating coils are supplied to the power management circuit 24 and then to a control circuit 25 which drives and controls the rotation of the motor 31. The control circuit 25 may comprises a conventional rectifier and stabilizer for rectifying and stabilizing the AC voltages to provide a DC voltage and control the motor 31 to rotates clockwise or counterclockwise. The control circuit 25 is connected with a regulating unit 26 for regulating and setting the rotation angle of the motor 31.

When the motor 31 rotate clockwise, the reduction gear set 32 meshing with the transmission shaft 311 of the motor 31 drives the toothed disc 33 to rotate clockwise and pull the two pulling cords 34a, 34b. At this point, the two curved braking plates 21 are pulled by the pulling cords 34a, 34b toward the stator 20, and the air clearance between outer surfaces of the permanent magnets 22 on the curved braking plates 21 and the inner circumferential surface of the rotor 11 is increased to reduce the brake force of the braking assembly.

And, when the motor 31 rotates counterclockwise, the pulling of the curved braking plates 21 by the pulling cords 34a, 34b is released, and the restoring force of the compression springs 35 pushes the curved braking plates 21 radially outward to reduce the air clearance between outer surfaces of the permanent magnets 22 on the curved braking plates 21 and the inner circumferential surface of the rotor 11, and the brake force of the braking assembly is increased. That is, the brake force of the braking assembly of the present invention may be electrically automatically regulated.

When the present invention includes two or more power generating coils, the power generated by one of the power generating coils is supplied via the power management circuit 24 to the charging circuit 27, rechargeable battery 272, LED indicator and backlight 273 and display unit 274 of the control panel 27, while the power from the other power generating coil is supplied to the motor 31. However, the motor 31 may not work for most of the time, for example 90% of the time. When the motor suspends rotation, under the control of the power management circuit 24, the power to the motor is supplied to the rechargeable battery 272 via the charging circuit 271.

As shown in FIG. 3, the power management circuit 24 is capable to manage individually the powers generated by the power generating coils 23, 23a, 23b, 23c, 23d, 23e. Please refer to FIG. 4 which shows a regulation of power under the control of the power management circuit 24 of FIG. 3.

Figure 4:
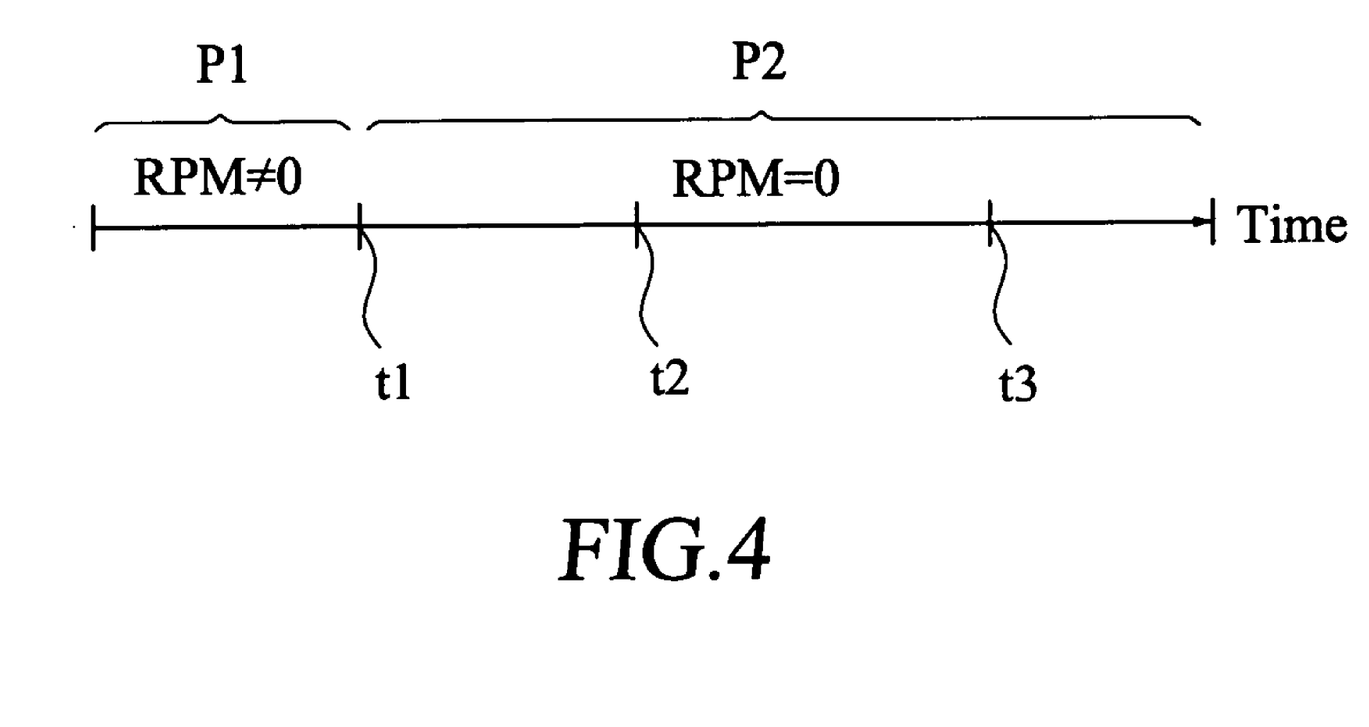
FIG. 4 is a schematic view showing a regulation of power under the control of a power management circuit of FIG. 3.

In the period P1 when the rotation speed in RPM of the rotary central shaft 10 is not equal to zero, power is supplied to the motor 31 for maintaining the normal operation of the motor 31. Also, power is steadily supplied to the charging circuit 271, rechargeable battery 272, LED indicator and backlight 273 and display unit 274.

In the period P2 when the rotation speed in RPM of the rotary central shaft 10 is equal to zero, from the time t1 the rotation speed becoming zero to a predetermined time t2, power supply to the LED indicator and backlight 273 is terminated under the control of the power management circuit 24. Anyway, power supply to the display unit 274 is maintained. Thereby, power can be efficiently saved. When the rotary central shaft 10 stops rotation for a predetermined time t3, under the control of the power management circuit 24, power supply to the display unit 274 is terminated. In other words, the control panel 27 enters a sleeping mode after t3. The power management is helpful to the user who temporarily pauses his action.

Figure 5:
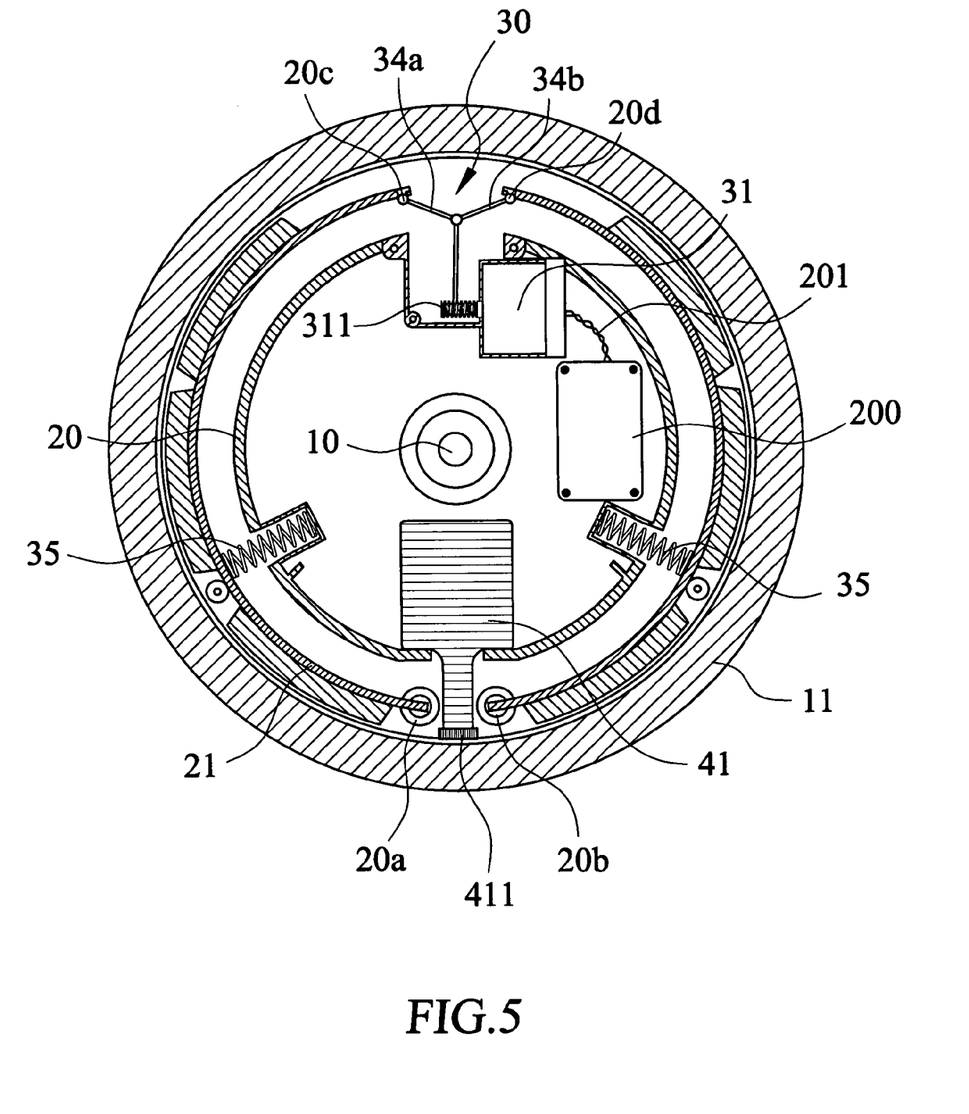
FIG. 5 is plan view of the braking assembly according to a third embodiment of the present invention.

FIG. 5 shows a plan view of the braking assembly according to a third embodiment. The third embodiment is substantially similar to the first embodiment, however, the third embodiment is different to the first embodiment in that the power generating coil 23 is replaced by a friction electric generator 41 and that no permanent magnet is provided on the outer surface of the rotary central shaft 10. The friction electric generator 41 comprises a coil and a transmission shaft disposed therein. Also, the friction electric generator 41 includes a friction wheel 411 projected from an outer end of the friction electric generator 41 and contacting the inner circumferential surface of the rotor 11. When the rotor 11 rotates, the friction wheel 411 is turned to rotate, and in turn drives the transmission shaft and coil to generate power.

Figure 6:
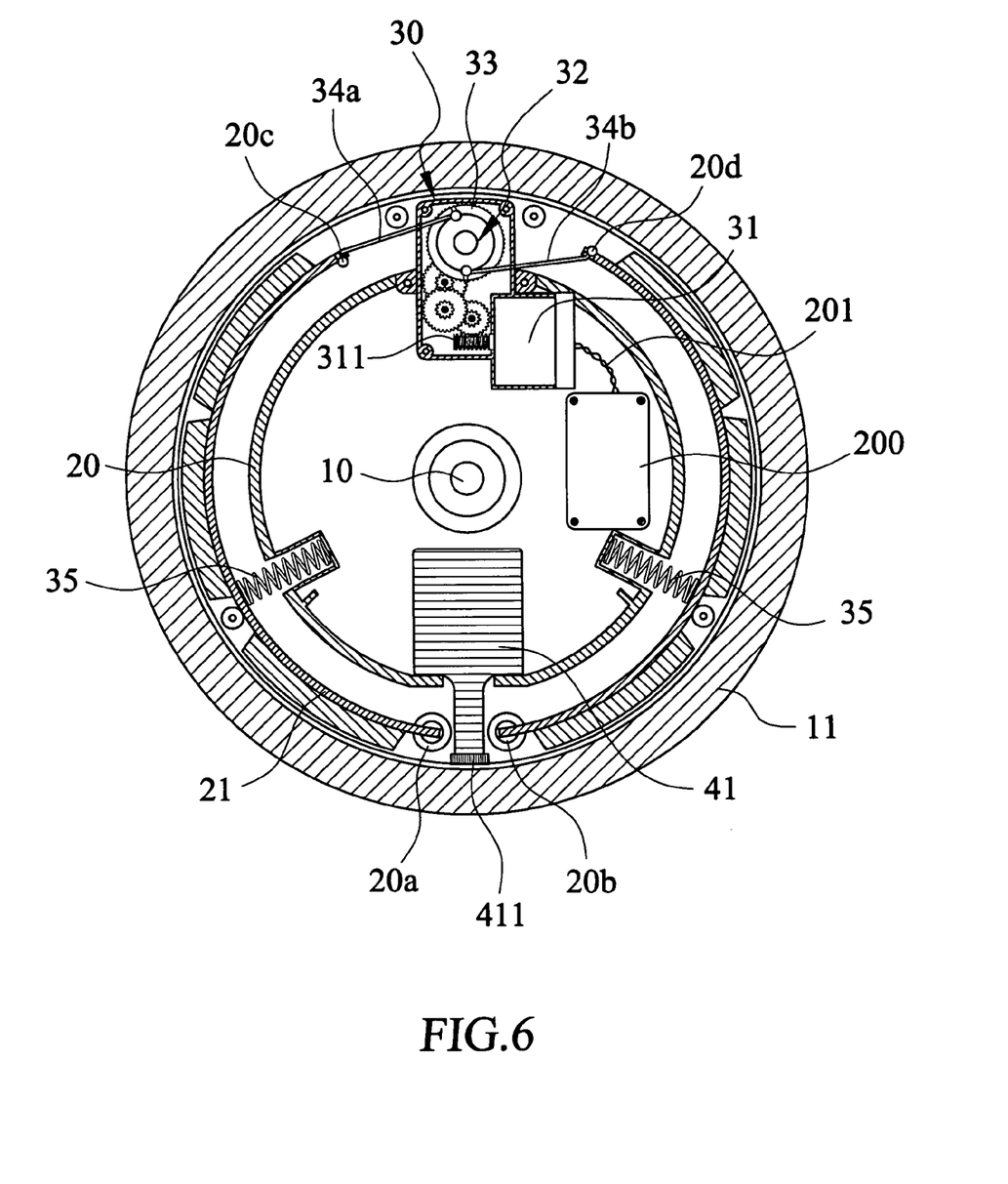
FIG. 6 is plan view of the braking assembly according to a fourth embodiment of the present invention.

With reference to FIG. 6, FIG. 6 shows a fourth embodiment of the braking assembly. The fourth embodiment is substantially similar to the third embodiment, however, the fourth embodiment is different to the third embodiment in that the power generating coil 23 is replaced by a friction electric generator 41 and that the pulling mechanism 30 comprising a reduction gear set 32 similar in structure to that shown in FIG. 2.

Figure 7:
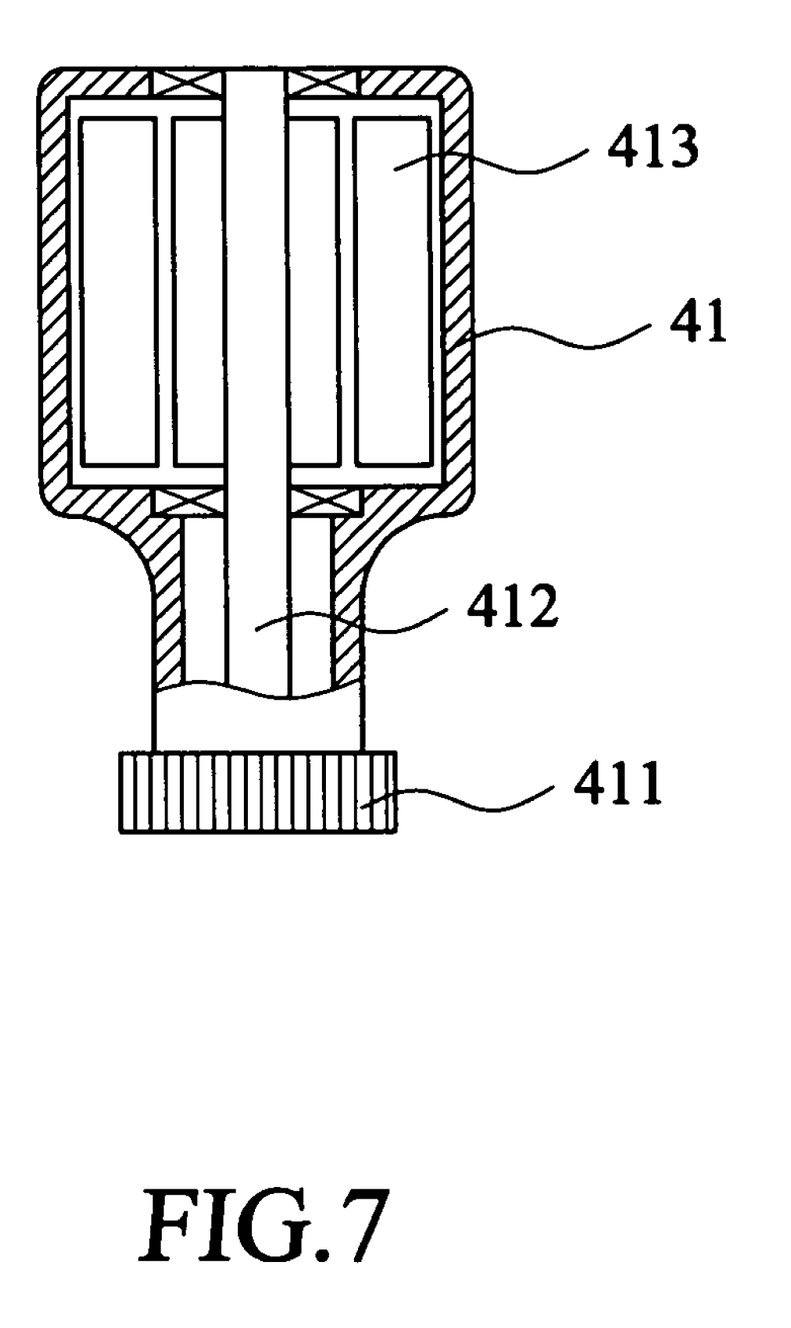
FIG. 7 is a cross-sectional view of a friction electric generator of the braking assembly.

Please refer to FIG. 7 which is a cross-sectional view of the friction electric generator 41. As shown, the friction electric generator comprises a friction wheel 411, a transmission shaft 412 and a coil 413. When the friction wheel 411 is turned by the rotor 11, the friction wheel 411 drives the transmission shaft 412 to rotate, and hence power is generated by the coil 413.

While the present invention has been described with reference to the specific embodiments, the description is illustrative of the invention and is not to be construed as limiting the invention. Therefore, various modifications to the present invention can be made to the preferred embodiments by those skilled in the art without departing from the true spirit and scope of the invention as defined by the appended claims.

What is claimed is:

1. A braking assembly with a manageable self-generating power, comprising:

a stator having an outer circumferential surface and a central shaft hole for a rotary central shaft to extend therethrough;

a rotor, located around the outer circumferential surface of the stator to rotate along with the rotary central shaft when the rotary central shaft rotates;

a pair of curved braking plates, each having an outer circumferential surface, disposed between the outer surface of the stator and an inner surface of the rotor;

two adjacent ends of the two curved braking plates pivotally connected via a pivot shaft respectively to a predetermined position on the circumferential surface of the stator, and the other two adjacent ends of the two curved braking plates being free ends;

a plurality in first permanent magnets fixed to the outer circumferential surface of each the curved braking plate;

a pulling mechanism provided on the stator, which comprises a motor to pull the curved braking plates by the free ends;

a plurality of second permanent magnets, each of which having a north pole and a south pole, arranged around an outer surface of the rotary central shaft, so that the north poles and the south poles of the second permanent alternate around the rotary central shaft;

a plurality of power-generating coils being provided on the stator at a position close to the second permanent magnets around the rotary central shaft, whereby when the rotary central shaft rotates and brings the second permanent magnets to rotate at the same time, an AC voltage is generated through induction of each of the power-generating coils; and a circuit board mounted at the stator, comprising a control circuit and a power management circuit which is connected to the power generating coils for receiving the AC voltages generated at the power generating coils and supplying the AC voltages to the control circuit for rectifying and stabilizing to generate a DC voltage to drive the motor of the pulling mechanism to rotate; and by means of the pulling mechanism, the air clearance between the outer circumferential surfaces of the curved braking plates and the inner circumferential surface of the rotor is controlled, and hence a braking force of the braking assembly is regulated.

2. The braking assembly as claimed in claim 1, wherein the pulling mechanism comprises a pair of pulling cords which are fixedly connected at respective one end to free ends of the two curved braking plates, and at respective another end to a transmission shaft of the motor for dragging, such that by adjusting the pulling cords by the motor, the air clearance between the outer circumferential surfaces of the curved braking plates and the inner circumferential surface of the rotor is controlled, and thereby the braking force of the braking assembly is regulated.

3. The braking assembly as claimed in claim 1, wherein the braking assembly further comprises a control panel connecting to the power management circuit, which includes at least one LED indicator and backlight.

4. The braking assembly as claimed in claim 3, wherein the control panel is powered by the power generated by the power generating coils under the control of the power management circuit.

5. The braking assembly as claimed in claim 3, wherein the control panel further comprises a display unit, to which the power generated by the power generating coils are supplied under the control of the power management circuit.

6. The braking assembly as claimed in claim 3, wherein the control panel further comprises a charging circuit and a rechargeable battery, and the power generated by the power generating coils is supplied to the charging circuit for charging the rechargeable battery.

7. A braking assembly with manageable self-generating power, comprising:
   a stator having an outer circumferential surface and a central shaft hole for a rotary central shaft to extend therethrough;
   a rotor, located around the outer circumferential surface of the stator to rotate along with the rotary central shaft when the rotary central shaft rotates;
   a pair of curved braking plates, each having an outer circumferential surface, disposed between the outer surface of the stator and an inner surface of the rotor;
   two adjacent ends of the two curved braking plates pivotally connected via a pivot shaft respectively to a predetermined position on the circumferential surface of the stator, and the other two adjacent ends of the two curved braking plates being free ends;
   a pulling mechanism provided on the stator, which comprises a motor to pull the curved braking plates at the free ends;
   a plurality of permanent magnets fixed to the outer circumferential surface of each of the curved braking plates, and an air clearance is formed between the outer circumferential surfaces of the curved braking plates and the inner circumferential surface of the rotor;
   at least one friction electric generator, which comprises a transmission shaft, a coil and a friction wheel projecting from an outer end of the friction electric generator and contacting the inner circumferential surface of the rotor, such that when the rotor rotates, the friction wheel drives the rotor the transmission shaft turns and an AC voltage is generated in the coil;
   a circuit board disposed at the stator, comprising a control circuit which receives the AC voltage generated by the friction electric generator and rectifies and stabilizes the AC voltage to generate a DC voltage to drive the motor of the pulling mechanism; and by means of the pulling mechanism, the air clearance between the outer circumferential surfaces of the curved braking plates and the inner circumferential surface of the rotor is controlled, and hence the braking force of the braking assembly is regulated.

8. The braking assembly as claimed in claim 7, wherein the pulling mechanism comprises a pair of pulling cords which are fixedly connected at respective one end to free ends of the two curved braking plates, and at respective another end to a transmission shaft of the motor for dragging, such that by adjusting the pulling cords by the motor, the air clearance between the outer circumferential surfaces of the curved braking plates and the inner circumferential surface of the rotor is controlled, and thereby the braking force of the braking assembly is regulated.

9. The braking assembly as claimed in claim 7, wherein the circuit board comprises a power management circuit which is connected to the friction electric generator for receiving the AC voltage generated at the coil and controlling the supply of the power to the control circuit.

10. The braking assembly as claimed in claim 9, wherein the braking assembly further comprises a control panel connecting to the power management circuit and includes at least one LED indicator and backlight, and the control panel is supplied by the AC voltage generated by the friction electric generator under the control of the power management circuit.

11. The braking assembly as claimed in claim 10, wherein the control panel further comprises a display unit, to which the AC voltage generated by the friction electric generator is supplied under the control of the power management circuit.

12. The braking assembly as claimed in claim 10, wherein the control panel further comprises a charging circuit and a rechargeable battery, and the AC voltage generated by the friction electric generator is supplied to the charging circuit for charging the rechargeable battery.

* * * * *